G. C. MARX.
MOTOR SUPPORT.
APPLICATION FILED APR. 3, 1916.

1,341,477.

Patented May 25, 1920.
2 SHEETS—SHEET 1.

Inventor
Gustave C. Marx

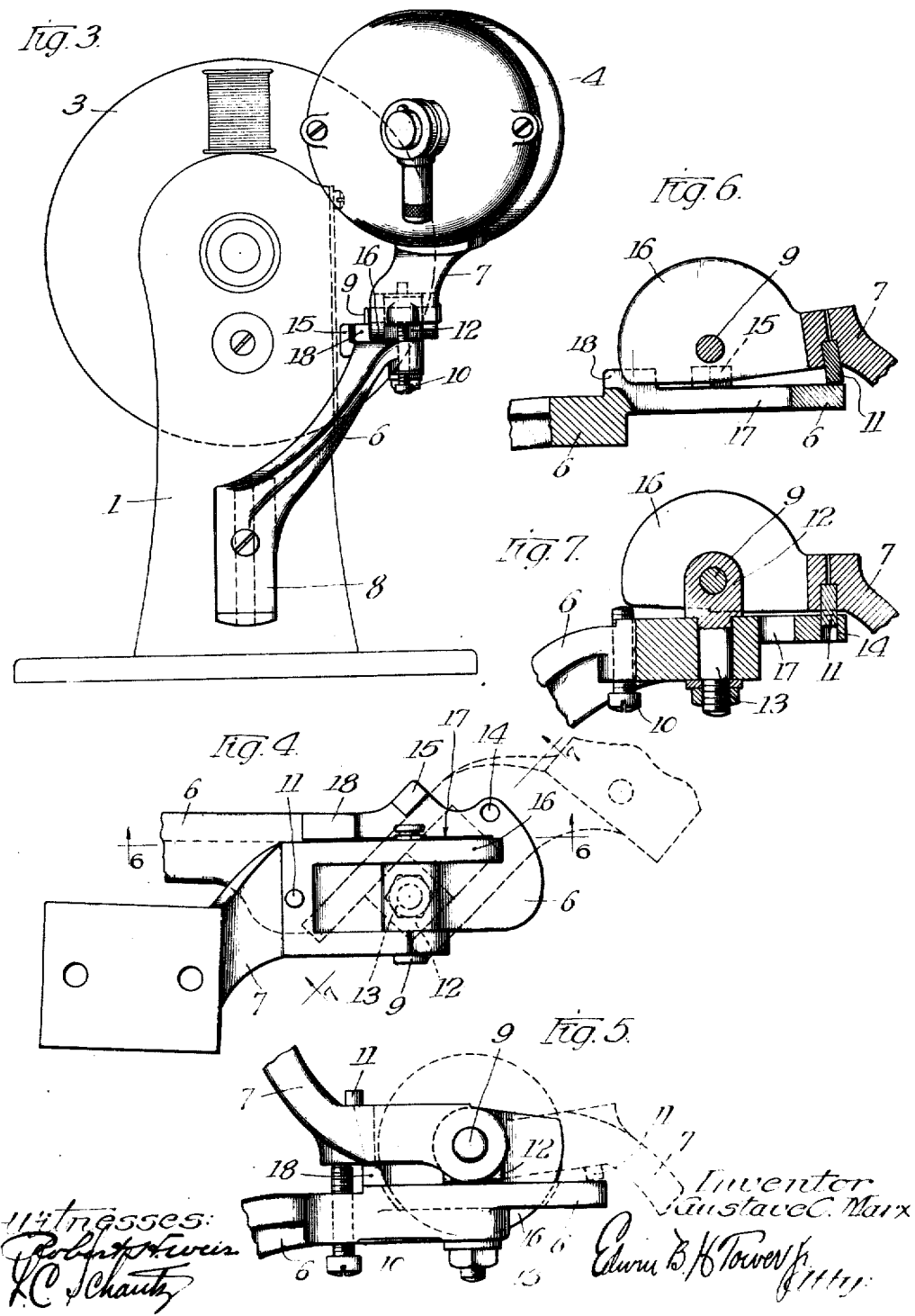

UNITED STATES PATENT OFFICE.

GUSTAVE C. MARX, OF ELIZABETH, NEW JERSEY, ASSIGNOR TO DIEHL MANUFACTURING COMPANY, OF ELIZABETH, NEW JERSEY, A CORPORATION OF NEW JERSEY.

MOTOR-SUPPORT.

1,341,477.   Specification of Letters Patent.   Patented May 25, 1920.

Application filed April 3, 1916. Serial No. 88,566.

*To all whom it may concern:*

Be it known that I, GUSTAVE C. MARX, a citizen of the United States, residing at Elizabeth, in the county of Union and State of New Jersey, have invented new and useful Improvements in Motor-Supports, of which the following is a specification.

This invention relates to motor supports.

It more particularly relates to supports for electric motors used to drive sewing machines and the like.

Sewing machines generally have a frame which comprises a vertical standard having a horizontal arm extending therefrom. A rotatable operating shaft having a fly wheel thereon is carried by the frame, the shaft being housed within the frame and the fly wheel being on the exterior thereof adjacent the standard. The frame is usually mounted on a table.

Various structures have been devised for supporting an electric motor in driving relation to the operating shaft, the motor drive wheel in some cases engaging the fly wheel of the machine to drive the shaft. These structures often support the motor so that it interferes with placing the usual cover over the machine or with the dropping of the frame into a housing beneath the table.

It is important that a simple support be devised which can be readily and firmly attached to the frame without requiring any alterations therein and which will support the motor in proper driving relation to the machine and at the same time permit the motor to be moved to a position where it will not interfere with the usual housing of the machine. A support of this character is disclosed in a copending application of Gustave C. Marx, Serial No. 53,345, filed September 30, 1915, of which the present application is a continuation in part. The present invention relates to improvements on said support.

One of the objects of the invention is to provide an improved motor support which may be readily attached to the end of a sewing machine frame.

Another object is to provide an improved motor support having means for positively guiding the motor while it is being moved into and out of driving position.

Another object is to provide an improved motor support having means for preventing the motor from striking the machine during its movement to and from driving position.

Another object is to provide an improved motor support whereby the motor may be moved in two angularly related planes from a driving to a non-driving position.

Other objects and advantages of the invention will hereinafter appear.

The accompanying drawings illustrate an embodiment of the invention.

The views of said drawings are as follows:

Fig. 3 is an end elevation of Fig. 1.

Fig. 4 is a top plan of the improved bracket showing in dotted lines the retracted position of the motor supporting arm.

Fig. 5 is a side elevation of a portion of the support showing in dotted lines the position of the motor supporting arm at the end of its movement in one plane.

Fig. 6 is a partial cross section on the line 6—6 of Fig. 4 illustrating the structure by means of which the motor supporting arm is positively guided during its movement.

Fig. 7 is a partial cross section on the line 7—7 of Fig. 4 showing the manner in which the motor supporting arm is locked in retracted position.

Figure 1:
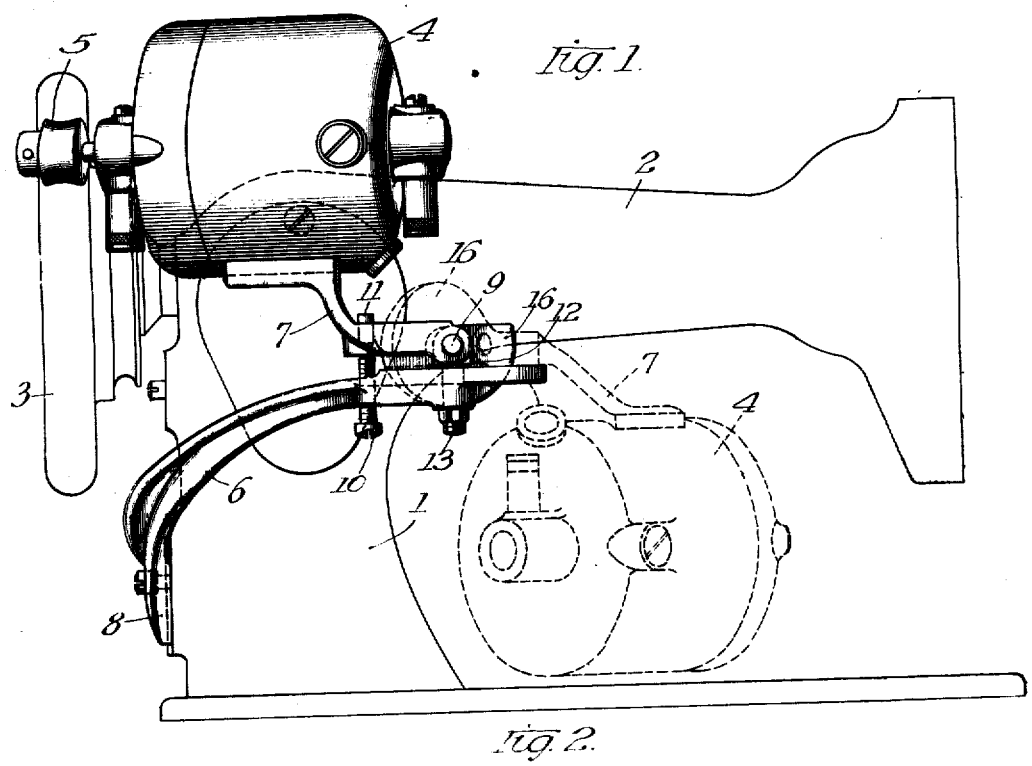
Figure 1 is a side elevation of the improved bracket attached to a sewing machine, the motor being illustrated in full lines in driving position and in dotted lines in its retracted position.
Figure 2:
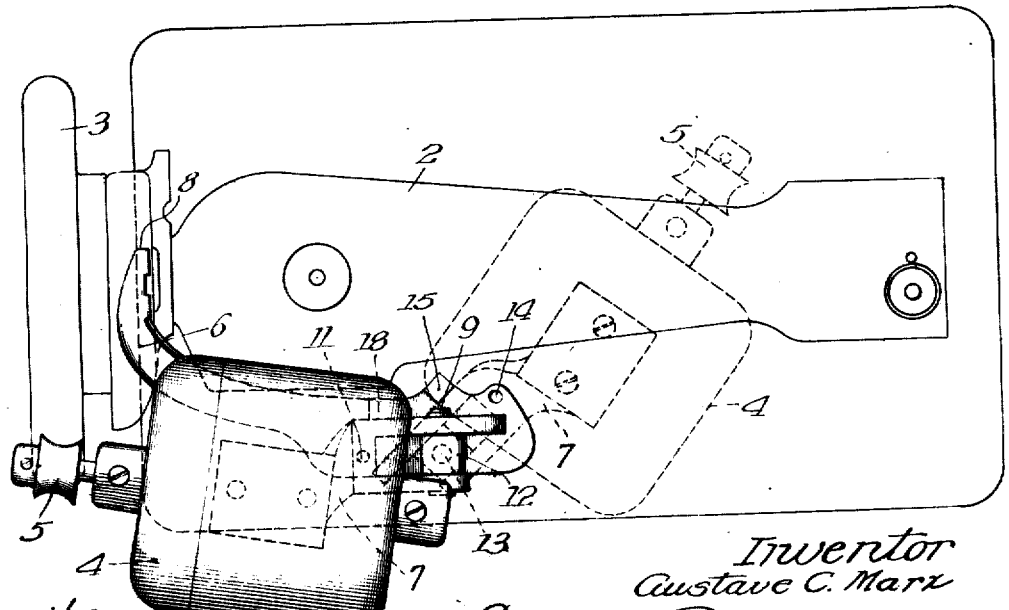
Fig. 2 is a top plan of Fig. 1.

The sewing machine illustrated in Figs. 1, 2 and 3 has a frame comprising a standard 1 and an arm 2 with a fly wheel 3 carried by the frame and connected to the operating shaft of the machine.

The motor for driving the machine is a small electric motor 4 of any suitable type. It is provided with a friction drive wheel 5 which is adapted to engage the rim of the fly wheel 3.

The motor support comprises in general a bracket having a relatively stationary bracket or arm 6 for attachment to a sewing machine frame, and a pivoted arm 7 adapted to carry the electric motor 4, the arm 7 being pivoted to move in two planes so that the motor may be moved from its driving position shown in full lines in Fig. 1 to a position beneath the arm 2 as illustrated in Figs. 1 and 2.

The present improvement relates more particularly to the construction which permits the bracket to be readily applied to the end of a sewing machine frame without alterations in the frame or the support and to the novel means for positively guiding the motor supporting arm during its movement.

The stationary bracket or arm 6 has a base 8 integral therewith, which is shaped to fit a seat on the end of the sewing machine frame, said seat being provided as a standard construction on certain types of machines. The base is fastened to the seat by means of screws or other suitable fastening devices. This construction permits the support to be easily attached to the end of the frame without alterations in the construction of the frame or the support. The arm 6 is curved so that when it is attached to the end of the frame, the free end of the arm extends to the rear side of the frame.

The motor supporting arm 7 is pivoted on a pivot pin 9 so as to swing in a vertical plane approximately parallel with the sewing machine frame, the free end of the arm being adapted to be attached to the casing of the electric motor 4. The arm 7 is shaped and located so that when it is in the full line position shown in Fig. 1, the motor 4 is supported with its drive wheel in frictional engagement with the rim of the fly wheel, the axis of the motor being above, to one side, and substantially parallel with the axis of the fly wheel so that if the motor were swung past the fly wheel, the path of the motor drive wheel would be a cord of the circle formed by the rim of the fly wheel. The motor drive wheel 5 is accordingly maintained in frictional engagement with the fly wheel by the weight of the motor and associated parts. The character of this engagement may be regulated by varying the position of the set screw 10 which forms a stop limiting the downward movement of the arm 7.

When the arm 7 is swung on the pivot 9, the motor 4 is moved away from its driving position, the path of movement being in a vertical plane substantially parallel with the sewing machine frame, and the extent of movement being limited by the engagement of a pin 11 on the arm 7 with the surface of arm 6. The two positions of the arm are illustrated in Fig. 5 where the full lines represent the position of the arm when the motor is in driving position and the dotted lines the position of the arm at the end of its movement in a vertical plane.

When the arm has reached the end of its movement in a vertical plane and the pin 11 is resting on the surface of arm 6, the motor is supported at one side of the sewing machine frame. In this position it is out of driving relation to the machine but it interferes with the housing of the machine. To avoid this difficulty the arm 7 is arranged to move in a substantially horizontal plane so that the motor 4 can be moved in a horizontal direction to a position under the arm 2 of the frame. The following construction permits this movement.

The pivot pin 9 is mounted in a bearing block 12 which forms the head of a pin 13, vertically pivoted on the stationary arm 6 as illustrated in Fig. 7. The pivots 9 and 13 form, in effect, a universal joint. After the arm 7 reaches the end of its movement away from driving position, with the pin 11 resting on the surface of the arm 6, it may then be moved in a substantially horizontal plane, the pin 11 riding on the surface of the arm 6 and supporting the motor. When the arm 7 reaches a position where the motor 4 is under the arm 2, the pin 11 automatically drops into an opening 14 in the arm 6 due to the weight of the motor. A stop 15 integral with the arm 6 is provided to limit the horizontal movement of the arm 7 and stop it in proper position for the pin 11 to drop into the opening 14. The arm 7 is thus automatically locked in position with the motor under the arm of the sewing machine frame. The position of the arm is shown in dotted lines in Figs. 2 and 4.

When the motor is moved away from driving position in a vertical plane, a simple universal joint mounting would permit it to be moved horizontally at the same time with the result that the motor would frequently strike the machine. When moved from its position beneath the arm, the motor might also be moved in a vertical direction before it had reached the end of the horizontal movement with consequent damage to both the motor and the machine. Accordingly the support is provided with novel means for guiding the motor supporting arm during its movement. This means insures that the motor will not strike the sewing machine frame while it is being moved to and from driving position.

The motor supporting arm 7 is provided with a semi-circular disk or segment 16 which moves in a slot 17 in the stationary arm 6. The slot 17 is just wide enough to accommodate the disk without binding. As long as the disk is in the slot, the arm 7 can move only about the pivot 9, any tendency to move about the pivot 13 being checked by the engagement of the disk with the walls of the slot. The disk is preferably integral with the arm 7 and located thereon so that it is in the slot when the motor is in driving position and during the entire time the motor is swung away from driving position until the arm 7 reaches a position where the pin 11 rests on the surface of stationary arm 6. The arm 7 is thus prevented from moving about the pivot 13 until it has reached the end of its movement about the pivot 9. The motor is accordingly prevented from striking the machine as it is moved away from driving position.

When the arm 7 reaches the end of its movement in a vertical plane, the disk 16 just clears the surface of the stationary arm 6. This position is clearly shown in Fig. 6. The arm 7 is then free to move in a horizontal plane.

As soon as the arm has moved in a horizontal plane the edge of the disk 16 is moved over the surface of the stationary arm 6 and the arm 7 cannot then be moved in a vertical plane because of the engagement of the edge of the disk with the surface of arm 6. The motor consequently cannot be moved in a vertical direction until it has been moved horizontally to the proper position.

In order to move the motor from its retracted position to its driving position it is lifted to withdraw the pin 11 from the recess 14 and moved in a horizontal direction until the disk 16 registers with the slot 17. A stop 18 integral with the stationary arm 6 is provided for stopping the arm 7 in proper position with the disk registering with the slot. The motor can then be moved in an arc about the pivot 9 to driving position where it is automatically maintained by the weight of the motor itself.

It will thus be seen that an exceedingly simple and inexpensive motor support has been provided which can be readily attached to the end of a sewing machine frame without requiring alterations in either the frame or the support. The motor is firmly supported in driving relation to the machine; it is automatically maintained in this position; it may be adjusted to vary the character of the driving engagement; it may be readily moved away from driving position to a position beneath the arm of the frame where it does not interfere with the housing of the machine; it is automatically locked in retracted position; and it is positively prevented from striking the machine while being moved to and from driving position.

It is to be understood that the embodiment shown is for purposes of illustration only and that other structures may be devised which embody the invention and which come within the spirit and scope of the appended claims.

What I claim as new and desire to secure by Letters Patent is:

1. The combination with a sewing machine of a motor, a bracket for supporting the motor, said bracket adapted to be attached to the sewing machine frame, a motor supporting arm mounted on said bracket so as to be movable in two planes, and means for preventing movement of said arm in one plane while it is being moved in the other.

2. The combination with a sewing machine of a motor, a bracket for supporting the motor, said bracket adapted to be attached to the sewing machine frame, a motor supporting arm pivoted on said bracket so as to be movable in two planes, and means for preventing movement of said arm in one plane while it is being moved in the other.

3. The combination with a sewing machine of a motor, a bracket for supporting the motor, said bracket adapted to be attached to the sewing machine frame, a motor supporting arm mounted on said bracket so as to be movable in two planes, and a disk on one of said elements adapted to coöperate with the other element to prevent movement of the arm in one plane while it is being moved in the other.

4. The combination with a sewing machine of a motor, a stationary arm adapted to be attached to the end of a sewing machine frame and extend to the side thereof, said arm having a motor supporting arm pivoted thereto so as to be movable in two planes, and means for preventing movement of the motor supporting arm in one plane while it is being moved in the other.

5. A support for motors and the like, comprising a bracket, an arm pivoted thereto so as to be movable in two planes, and a semi-circular disk on the arm coöperating with a slot in the bracket to prevent movement of the arm in one plane while it is being moved in the other.

6. A motor support comprising a bracket adapted to be attached to a sewing machine frame, a motor supporting arm pivoted to said bracket so as to be movable in two planes, and a semi-circular disk on the arm coöperating with a slot in the bracket to prevent movement of the arm in one plane while it is being moved in the other.

7. A motor support comprising a relatively stationary arm adapted to be attached to the end of a sewing machine frame and to extend to the side thereof, a movable arm pivoted to said bracket for supporting an electric motor in driving relation to said machine, said movable arm being pivoted so that it is movable in two planes to permit the motor to be moved from driving position to a position beneath the sewing machine frame, and a disk on one of said arms coöperating with the other arm to prevent movement of said movable arm in one plane while it is being moved in the other.

8. A motor support for a sewing machine with a frame and drive wheel of the usual cover and drop head type, comprising a pivotal motor carrying bracket for attachment to the sewing machine frame and for supporting the motor in driving position where the cover cannot be applied or the head depressed and for moving the motor in two angularly related planes into a non-driving position where the motor and frame can be covered or depressed, and means on the bracket for preventing the motor from being moved simultaneously in the two planes so that the motor cannot strike the frame when being moved from driving to non-driving position.

9. The combination with a sewing machine of a motor, a driving connection between the motor and the machine, means for supporting the motor so that it is automatically maintained in driving position, said means permitting the motor to be moved in two angularly related planes to a position beneath the arm of the sewing machine frame, said supporting means being adapted to positively prevent the motor during its movement from engaging said frame.

10. The combination with a sewing machine of the usual cover or drop head type and having a frame and a drive wheel, of a motor bracket attached to the frame and pivotally supporting the motor so that the motor may be moved in two angularly related planes from a driving position relative to the drive wheel wherein the motor prevents the application of a cover or the depression of the frame to a non-driving position wherein the motor and frame may be covered or depressed, and means associated with the bracket for positively preventing the motor from being moved simultaneously in both planes so that the motor cannot strike the frame during the swinging of the motor from one position to another.

11. The combination with a sewing machine of a motor having a friction drive wheel, means adapted to be attached to the end of the sewing machine frame to support the motor at the side of said frame with the drive wheel automatically maintained in engagement with the fly wheel of the machine by the weight of the motor, said means permitting the motor to be moved in substantially vertical and horizontal planes from its driving position to a position beneath the arm of the sewing machine frame, and means associated with said first-named means for preventing movement of the motor in one plane while it is being moved in the other.

12. The combination with a sewing machine of an electric motor and a relatively stationary arm adapted to be attached to the end of the sewing machine frame and to extend to the side thereof, a movable arm pivoted to said stationary arm for supporting the motor in driving relation to the machine, said movable arm being movable in both vertical and horizontal planes so that the motor may be moved in a vertical plane from driving position and in a horizontal plane to a position beneath the arm of the sewing machine frame, one of said arms having a disk thereon coöperating with the other arm to prevent movement of the movable arm in one plane while it is being moved in the other.

13. The combination with a sewing machine of an electric motor having a friction drive wheel, and a relatively stationary arm adapted to be attached to the end of the sewing machine frame and to extend to the side thereof, a movable arm pivoted to said stationary arm for supporting the motor so that the weight of the motor automatically maintains the driving wheel in frictional engagement with the fly wheel of the machine, said arm being pivoted so that it is movable in both a vertical and a horizontal plane whereby the motor may be moved in a vertical plane from driving position and in a horizontal plane to a position beneath the arm of the sewing machine frame, said movable arm having a disk thereon coöperating with a slot and with the surface of the other arm to prevent movement of the arm in one plane during its movement in the other.

14. The combination with a sewing machine of a motor, a driving connection between the motor and the machine, means for supporting the motor so that it is automatically maintained in driving position, said means permitting the motor to be moved in two planes toward a position beneath the arm of the sewing machine frame, said supporting means being adapted to positively prevent the motor during its movement from engaging said frame.

15. The combination with a sewing machine of an electric motor, a relatively stationary arm adapted to be attached to the end of the sewing machine frame and to extend to the side thereof, a motor supporting arm pivoted to said stationary arm, said arm being adapted to move in two planes so that the motor may be moved from driving position toward a position beneath the arm of the sewing machine frame, said arms having coöperating means thereon for preventing the motor during movement thereof from engaging the sewing machine frame.

In witness whereof I have hereunto subscribed my name in the presence of two witnesses.

GUSTAVE C. MARX.

Witnesses:
C. H. MORRELL,
H. L. ZABRISKIE.